United States Patent [19]

Vigarie et al.

[11] Patent Number: 4,748,619
[45] Date of Patent: May 31, 1988

[54] PACKET DEMULTIPLEXING OF A MAC/PACKET BROADCAST SIGNAL

[75] Inventors: Jean-Pierre Vigarie, 32 Rue des Tilleuls, 35510 Cesson Sevigne; Yves-Francois Dehery, 28 Rue V. Rault, 35000 Rennes, both of France

[73] Assignees: Jean-Pierre Vigarie; Yves-Francois Dehery, both of Rennes, France

[21] Appl. No.: 16,767

[22] Filed: Feb. 20, 1987

[30] Foreign Application Priority Data

Feb. 20, 1986 [FR] France .................. 86 02318

[51] Int. Cl.$^4$ .............................................. H04J 3/24
[52] U.S. Cl. .................................. 370/94; 370/88
[58] Field of Search ............... 370/85, 86, 88, 94, 370/60, 112; 340/825.06, 825.07, 825.52

[56] References Cited

U.S. PATENT DOCUMENTS 4,347,498  8/1982  Lee et al. ................. 370/60
4,598,400  7/1986  Hillis ....................... 370/94
4,651,318  3/1987  Luderer .................... 370/60
4,701,909 10/1987  Kavehrad et al. ........ 370/94

Primary Examiner—Douglas W. Olms
Assistant Examiner—Wellington Chin
Attorney, Agent, or Firm—Antonelli, Terry & Wands

[57] ABSTRACT

The device is for use in demultiplexing a MAC/-PACKET incoming signal which comprises successive bursts of digital data distributed into packets, each packet consisting of useful data and a header having a channel number indicating one of a plurality of service components to which said packet is assigned, a continuity index IC and a header error protection code. The device has a circuit for generating all error-free configurations of a selected channel number and IC and corresponding to a respective service component; an encoder for encoding all error-free configurations into all possible theoretical header configurations having the error protection code; and a computer for computing the Hamming distances between each packet header in the incoming signal and all theoretical header configurations. Those packets for which the Hamming distance is not greater than a predetermined value are directed to an output interface.

7 Claims, 3 Drawing Sheets

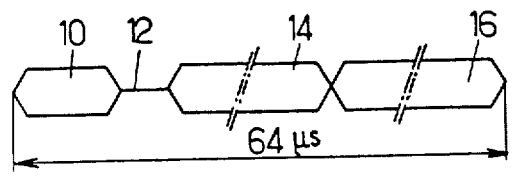
FIG.1.
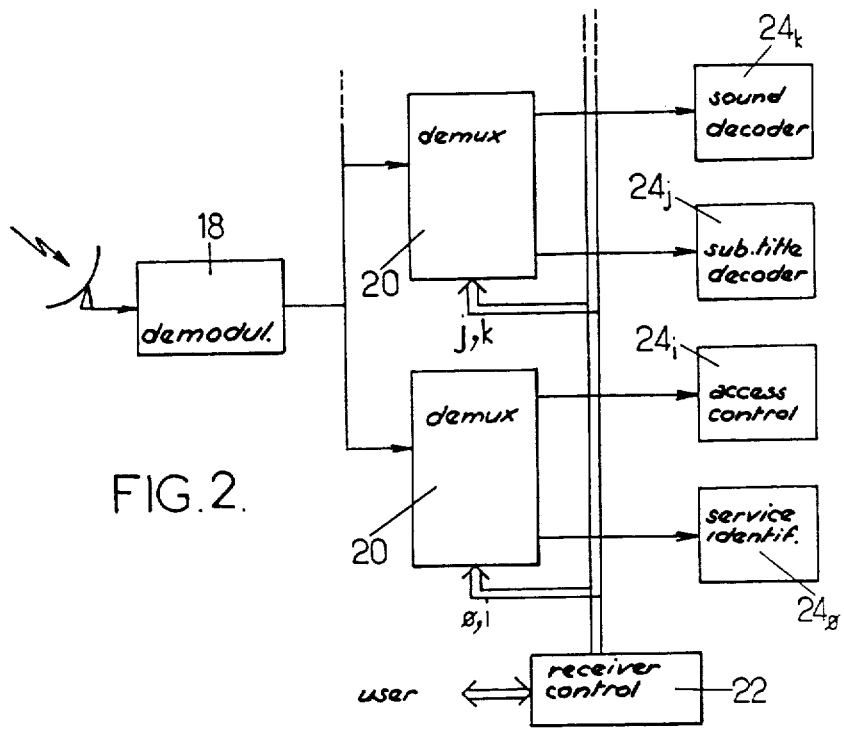
FIG.2.
FIG.4.
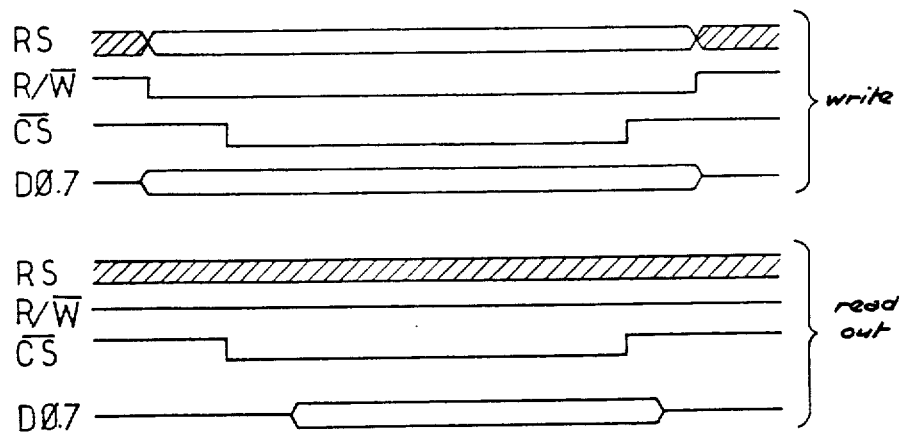

PACKET DEMULTIPLEXING OF A MAC/PACKET BROADCAST SIGNAL

BACKGROUND OF THE INVENTION

The invention relates to the broadcast of digital data in a base configuration conforming to one of the C, D or D2 MAC/PACKET standards drawn up particularly for direct satellite broadcasting, particularly of television programs, as well as for digital signal distribution systems using a similar packet multiplexing protocol. This family of standards provides, when applied to direct satellite broadcasting or cable distribution as well as to broadcasting on land channels, two levels of multiplexing of the different types of information to be transmitted. The digital information is first multiplexed as packets, each packet transporting data belonging to a single service component. The digital sequence thus obtained includes information relative to sounds transmitted in digital form and to data. A second multiplexing level gives rise to an overall signal including the digital train and the information relative to the image, as well as control information. The existing standards also provide for possible full raster digital information distribution. A description of the C-MAC/PACKET standard in which modulation of the digital train is achieved by PSK 2-4 encoding may for example be found in "The C-MAC/PACKET system for direct satellite television" by Mertens et al, EBU Review, Technical No. 200, August 83. But the invention is also applicable to other standards such as D or D2-MAC/PACKET and more generally in all cases where a digital train is used structured similarly in packets.

SUMMARY OF THE INVENTION

The invention is particularly suitable for use in a receiver, for demultiplexing a broadcast signal of C, D or D2-MAC/PACKET type, or similar signal, formed by a signal including successive trains of digital data divided up into packets assigned to one or more different service components, each having a header containing a channel number. It is an object of the invention to provide a device for extracting the packets associated with one or more given service components and delivering them at one or more particular outputs.

To this end, there is provided a device for demultiplexing packets coming from a signal including successive trains or "bursts" of digital data structured in packets assigned to one or more different service components, each packets having a header containing a channel number, said device being arranged for extracting the packets which are associated with one or more given service components and delivering them at particular outputs; the device comprises a circuit for generating all the configurations corresponding to the selected channel number, means for encoding said configurations in accordance with the code for protection against errors affecting the digital signal transmitted, allowing all the theoretical coded configurations of corresponding headers to be obtained, means for determining the Hamming distances between the header received and said coded header configurations and means for directing to an output interface those packets for which the Hamming distance is less than or equal to a predetermined value.

In practice, the outputs may be formed either by individual connections or by virtual outputs obtained by as many validation signals as there are outputs and a single data output.

If the signal is according to the C, D or D2 MAC/PACKET standard, where each header contains a continuity index in addition to the channel number, the generating circuit is provided for supplying the header configurations corresponding to all values of the continuity index for the same selected channel number. The means for determining the Hamming distances typically include several sequential single bit correlators, in number equal to that of the configurations corresponding to the same channel number, each correlation failure being used for incrementing a counter.

The invention will be better understood from the following description of a paticular embodiment given by way of example.

SHORT DESCRIPTION OF THE DRAWINGS

FIG. 1 is a diagram showing the structure of a line in accordance with the C, D or D2-MAC/PACKET standards;

FIG. 2 is a general diagram of the stages of a direct satellite broadcast (DSB) receiver including a demultiplexing device for extracting the packets concerning two service channels previously selected by a user;

FIG. 4 is a timing diagram showing the signals which appear at the inputs and outputs of the control interface of the receiver of FIG. 2;

DETAILED DESCRIPTION OF THE INVENTION

Figure 3:
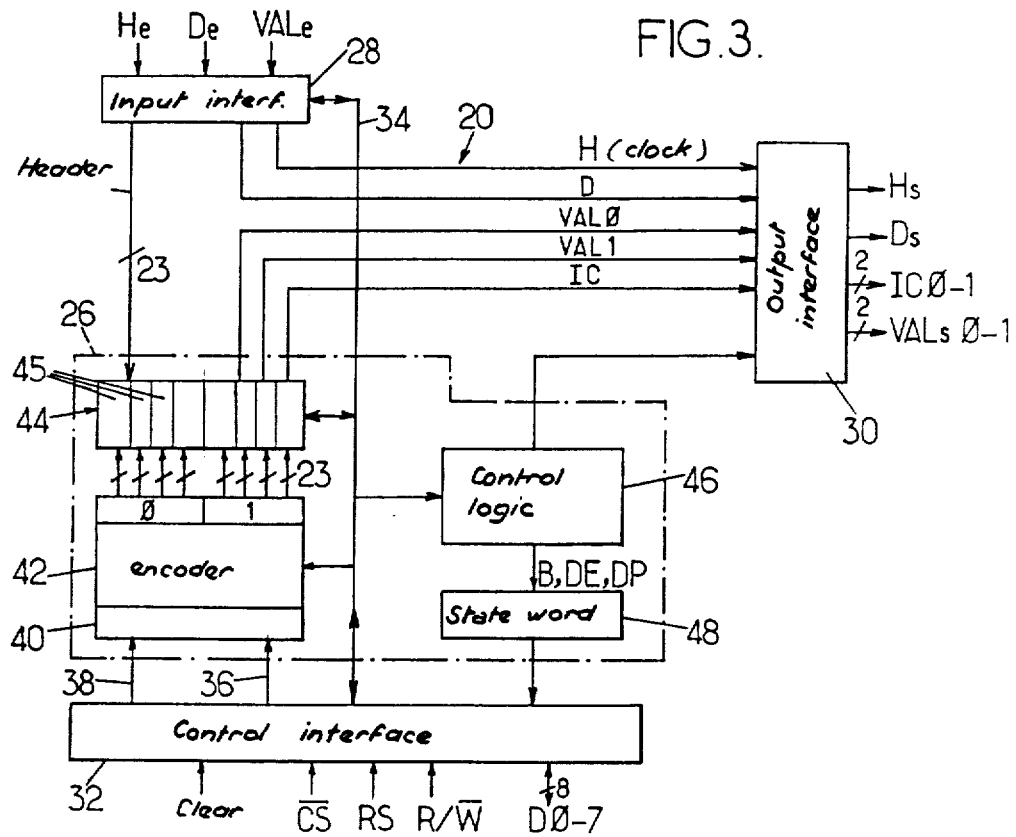
FIG. 3 is a block diagram of a demultiplexing device suitable for use in the receiver of FIG. 2.

Before describing the invention, the overall structure of a signal organized as provided for by the C, D or D2-MAC/PACKET standards will be briefly recalled. For a more complete description, reference may be made to the above-mentioned reference, as well as to numerous publications concerning the structures according to the D-MAC/ PACKET and D2-MAC/PACKET standards (in particular the document published by the French government entitled "Specifications du systeme D2-MAC/PACKET", September 1986). The basic raster of the D2-MAC/PACKET standard comprises for example 625 lines of which the last two are assigned to control information. Each scanning line, of 64 micro-seconds, is formed as shown in FIG. 1. It has successively a period assigned to a digital burst 10, the zero level 12 of color difference, a period 14 assigned to the chrominance (color-difference) signal and a period 16 assigned to the luminance signal.

The structure of a packet is as follows:

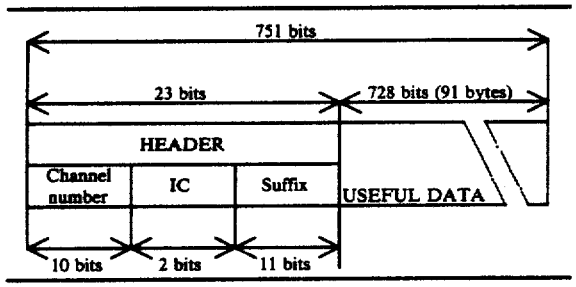

It can be seen that each packet includes a header and useful data. The header itself includes:

a channel number (address) of from 0 to 1023, which identifies the packets of the same service component and which is received with the least signification bit (LSB) first, a continuity index IC, for detecting a possible loss of packets, a protection suffix of 11 bits which protects the 12 bits consisting of the channel number and the continuity index;

the suffix is obtained by a correction code, generally a Golay code, which permits the correction of up to three errors occurring in the 23 bits to be corrected.

For a given channel number, a packet may have any one of four theoretical (error-free) headers, corresponding to the four possible values of the continuity index. Each of the headers may be indentified even in the case of transmission errors if the number of errors is such that the Hamming distance between the theoretical header as coded and the actually received header does not exceed 3.

Referring to FIG. 2, the input stages of a receiver include a demodulator 18 for restoring the digital train of received signal. The demodulation may have one of the usual constructions and it is therefore not necessary to describe it here.

The demultiplexing device receives the digital train structured in packets delivered by the demodulator 18.

It extracts the packets associated with one or more preselected service components and delivers the data thus obtained to dedicated processing modules. In the embodiment shown in FIG. 2, the demultiplexing device consists of a plurality of separate integrated circuits 20, each simultaneously processing two separate service components. Other embodiments are possible and a different number of service components can be processed at one time with a different arrangement. Finally, a unit for managing the receiver 22 is associated with the demultiplexing device and delivers thereto the channel numbers to be selected. By way of example, in FIG. 2 four processing modules $24_0$, $24_i$, $24_j$ and $24_K$ have been shown which may for example be assigned to service identification, to access control, to sub-title decoding and to sound component decoding. The packets of channels O, i, j, k, will thus be sent respectively to modules $24_0$ to $24_k$.

Each of the demultiplexing integrated circuits 20 may be as shown in FIG. 3. It may be regarded as having an extraction circuit 26, an input interface 28, an output interface 30 and a control interface 32.

The interfaces 28 and 30 have essentially a matching role. They may use TTL technology and their operation will be described assuming they operate with a "positive" logic.

The input interface 28 has three inputs respectively receiving signals:

He, formed by the binary clock signal extracted from the bit train in the signal delivered by the demodulator, De, incoming data, VALe, header validation or "enabling", which is present (at the high level) during the first 23 bits of the packet, corresponding to the header.

The interface transfers the clock signal H and the data signal D directly to the output interface 30. It directs the header, that is to say the bits received when VALe is high, to the extraction circuit 26.

The output interface 30 is for connection with the associated processing modules $24_0$ to $24_k$ in FIG. 2. The output interface 30 is of series type and it is provided for supplying signals:

Hs, clock at the bit rate of the outgoing bit train: the clock is continuous and available even when the other signals are not present at the output of interface 30.

Ds, data signal: Ds consists of the 728 data bits of each packet whose header is identified as corresponding to one of the service components to be extracted. These 728 bits leave in the order in which they are received, while the 23 bits of the header are not passed on.

VALs 0–1: each of these two outputs corresponds to an identified channel number and is active (i.e. high during the transmission of the 728 data bits of an outgoing packet identified as to be transferred.

ICO-1: continuity index (ICO being the LSB).

Both signals ICO and IC1 are activated for each packet by the extraction circuit which has identified the channel number received. The number of the channel concerned by the date delivered on Ds and ICO-1 is indicated by that one of the two outputs VALs 0–1 which is activated, i.e. at the high level.

The output interface 30 receives the clock H and the data D from the input interface 28 as already mentioned. It receives validation or "enabling" signals VAL 0 and VAL 1 and the continuity index from the extraction circuit, as will be seen later.

The control interface 32 is provided for controlling the demultiplexing circuits and monitoring the operation thereof. Since each demultiplexing circuit is provided for simultaneously processing two separate channel numbers, each channel number is supplied to the circuit as two bytes containing the channel index (one out of two) and the channel number (one out of one thousand and twenty-four). The word formed by the two bytes includes a bit for disabling at will one of the outputs of the demultiplexing circuit, independently of the other. The word may typically have, at the input of the extraction circuit 26, the following form:

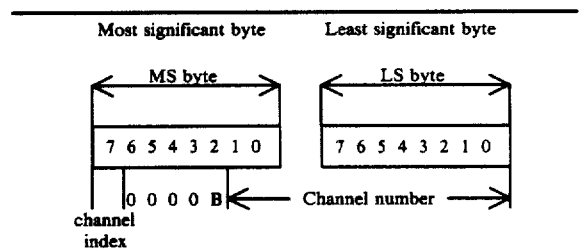

The channel index may take the values 0 and 1, for designating respectively the first and second channel. The bit B is used for disabling the output defined by the channel index if it is equal to 1 and then the channel number is ignored. Finally, ten bits are used for supplying the channel number, coded in pure binary.

The interface 32 will as a general rule be a parallel interface of microprocessor type, for loading into the demultiplexing IC to which it belongs, a control word containing a channel number (line 36) or a disabling order, and a channel index (line 38). Conversely, the interface 32 is able to read out the status word 48 of the multiplexing IC 20.

Consequently, the interface 20 will include the inputs:

$\overline{\text{RAZ}}$ or "clear", for receiving the initialization or starting signal (active when low), $\overline{\text{CS}}$, IC selection (active when low), RS: input for writing into the IC (input RS being ingnored during read out). The low and high levels of input RS designate respectively the L byte and the MS byte of the word which supplies the channel index and the channel number, carried by the output lines 38 and 36.

$\overline{\text{R/W}}$: read and write input, which defines the direction of the data bus 34 connecting the interfaces together. When the input R/W is high, the data leaves the demultiplexing IC 20. When low, the data is transferred to circuit 20.

D0–7: these lines are bidirectional and allow transfer of data as bytes; they are in the high impedance state when the respective demultiplexing IC 20 is not selected.

Such an interface 32 may be formed of a microprocessor and have a response time of the same order as a conventional memory or of a peripheral circuit of a microprocessor. Its operating timing diagram may be that shown in FIG. 4.

It can be seen that, during writing, a channel number is supplied to circuit 20 by the control interface 32 as a two-byte word, when the disabling bit B is zero. Writing the word requires write cycles. When RS=0, the least significant byte of the word is delivered to the circuit. Then, for RS=1, the most significant byte of the word is delivered to the circuit.

During read out, lines D0–7 receive the bytes read out from the integrated circuit from the control interface.

The extraction circuit 26 communicates with the interfaces 28 and 32 over bus 34 and communicates with all interfaces over additional lines which will be mentioned further on. It includes means for identifying all possible header configurations corresponding to a given service, indicated by a specific channel number.

For that, the extraction circuit 26 includes means for generating all header types corresponding to the four possible configurations of the continuity index, and for analyzing the header of each packet received so as to validate solely those packets which correspond to a service component.

In the embodiment shown in FIG. 3, these means include a generator 40 which generates, starting from the channel number supplied by lines 36 and 38, the four possible 12-bit configurations, depending on the value of the continuity index. The four configurations are supplied to an encoder 42 which generates, by applying the chosen generating polynominal, the four corresponding coded configurations.

In the embodiment illustrated, the extraction circuit 26 is able to process two separate channel numbers simultaneously, so that the generator and the encoder must be able to deliver aas two separate groups 0 and 1, eight theoretical coded configurations each in the form of a 23-bit word.

Figure 5:
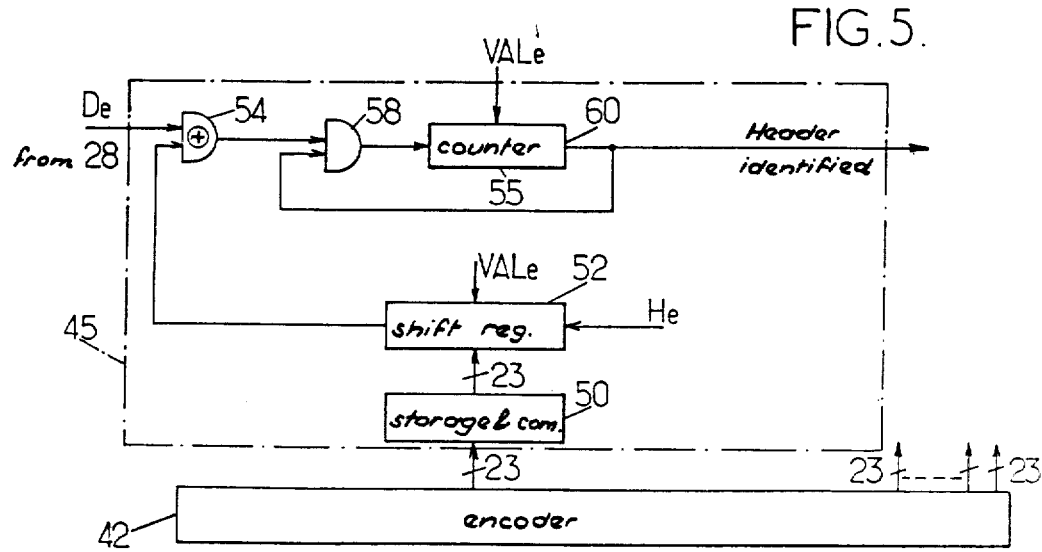
FIG. 5 is a block diagram of a one-bit correlator for use in the device for FIG. 3.

The words thus generated are applied to the reference inputs of a recognition circuit 44. This circuit may have different configurations. Referring to FIG. 5, a construction will be described which appears of particular interest. But it is sufficient for the recognition circuit 44 to be able to identify the four Hamming distances between the header received and the four theretical coded headers and to indicate as valid the packet if at least one of the four distances d thus obtained is less than or equal to 3. In the case of identification, the recognition circuit delivers to the output interface 30 a validation signal VAL0 or VAL1, depending on the group concerned, and a signal IC supplying the continuity index whose value depends on that configuration from the encoder which has been found closest to the actually received header.

On receipt of the signals, the interface 30 delivers the appropriate output signals VALs0 or VALs1, as well as signals Ds and ICO-1.

The extraction circuit 26 further includes a control logic 46 which may be formed by a status controller, connected to bus 34 so as to receive the information which circulates thereon. The logic is arranged for generating an internal status word representative of the condition of the system. The word is communicated to the control interface 32. In FIG. 3, this word is shown stored in a latch consisting of FF network 48.

When the IC is arranged fo simultaneously processing two separate channel numbers, logic 46 will deliver an internal status word formed of two groups (each assigned to a channel index) of three bits, B, DE, DP.

Bit B is the disabling bit already mentioned, which indicates that the output associated with the integrated circuit is disabled when at level 1.

The bit DE (header defect) indicates, when at level 1, that recognition circuit 44 has detected a header whose length is not of 23 bits.

The bit DP (packet defect) indicates, when at level 1, that a packet received has less than 751 bits, this exception being detected by a premature rise of signal VALe to 1.

The logic is not able to supply the value of DE and DP until the packet which has a defect has been fully processed. The latch 48 will maintain the two bits at the same value until the end of the next packet. The status word is transferred to the outputs D0–7 of interface 32 during a readout cycle (lower part of FIG. 4), in a format which may be as follows:

| 7 | 6  | 5  | 4 | 3 | 2  | 1  | 0 |
|---|----|----|---|---|----|----|---|
| 0 | DE | DP | B | 0 | DE | DP | B |
|   | Index = 1 | | | | Index = 0 | | |

The recognition circuit 44 may typically be as shown in FIG. 5, where a one-bit correlator is the essential identification element.

As shown in FIG. 1, the correlator includes a shift register 52 having a capacity of 23 bits. The parallel loading inputs of the register are connected to a calculating and header storage controller 50 which initially loads a reference configuration of 23 bits into the register. The configuration is computed by encoder 42 from the appropriate channel number and one of the continuity indices. The shift input of register 52 receives the clock signal He so that its content is shifted at each incoming bit of the packet header. Initial loading of the register is controlled by the signal VALe applied to the control input.

Each incoming data bit DE is compared with the bit present at the output of the shift register 52 in an EXLUSIVE OR (XOR) gate 54. The output of gate 54 is applied to the up country input of a modulo-4 counter 55 through an AND gate 58 which connects the output of the counter to its input. Counter 55 includes a clear input which receives the signal VALe, so that the counter is cleared before the header is received. The overflow output 60 of counter 65 is activated when the count exceeds 3. Due to gate 58, activation of the overflow output stops the counter at the value reached until the next clear input and indicates that the header received was not recognized as corresponding to the configuration loaded into the shift register.

The recognition circuit must have as many correlators as there are possible configurations, all correlators operating in parallel. The result of the correlation is available at latest after a duration of one bit beyond the reception of the twenty-third header bit. Two correlators cannot together recognize the same header since the words in the Glay code have a mutual distance of seven whereas the tolerance as regards recognition is only three.

The recognition circuit 44 of FIG. 5 has, in the particular case discussed above, eight single-bit correlators which require eight twenty-three bit shift registers 52 corresponding to the eight reference headers.

Figure 6:
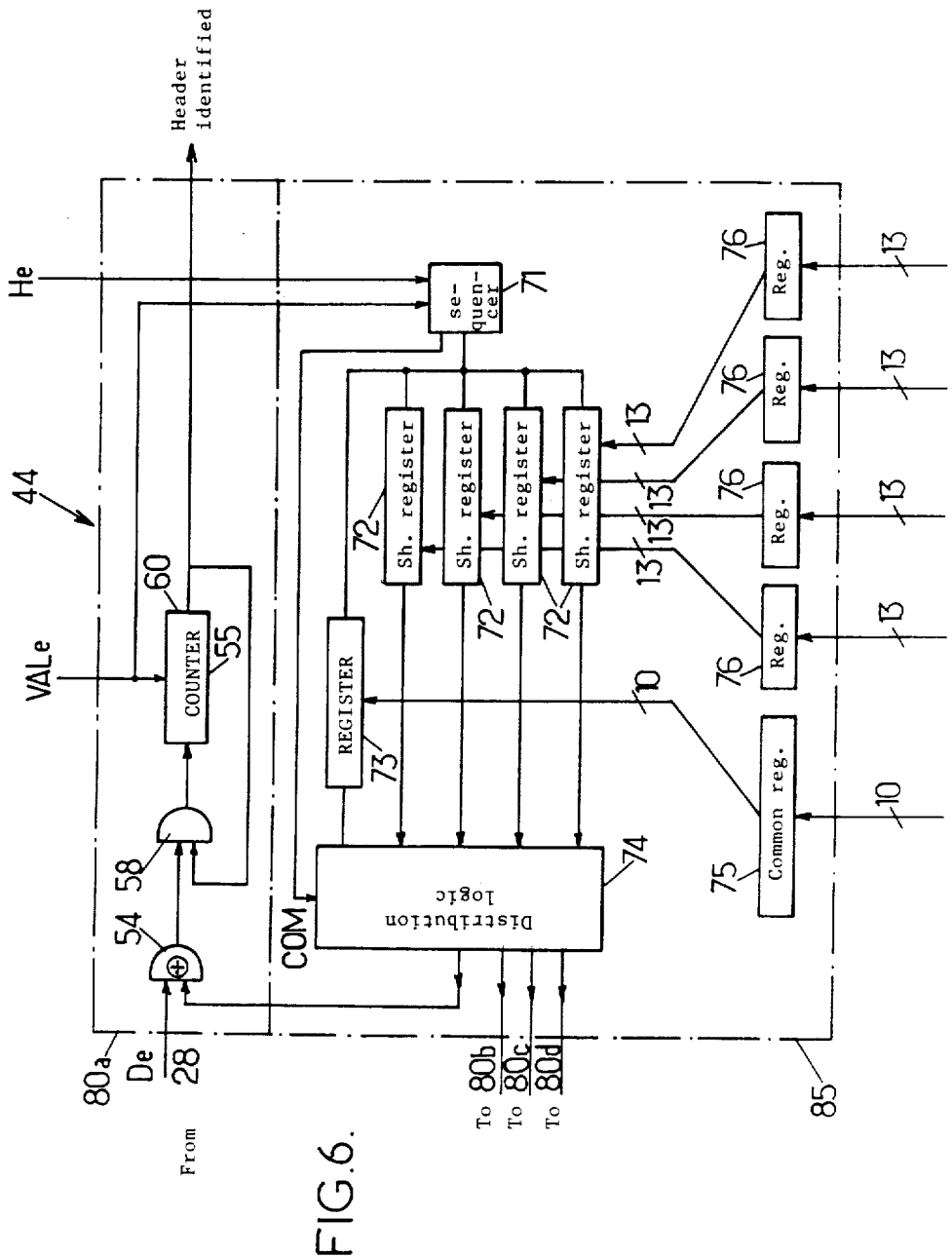
FIG. 6 is a block diagram of a modified embodiment of the device of FIG. 3.

Referring to FIG. 6, a modified circuit 44 only includes two 23-bit shift registers and eight 13-bit shift registers (for two continuity index bits and eleven protection suffix bits for each configuration). The modification, which reduces the size of the header storage registers 50 also requires a lesser number of memory positions. The integrated circuit may consequently be smaller in size.

As shown in FIG. 6, module 44 may consequently be considered as having eight sequential correlators 80 and two sub-modules 85.

Each sub-module 85 has, for one channel: a common 10-bit shift register 73 containing the channel number; four 13-bit dedicated shift registers 72 containing the continuity indices and the protection suffixes; and a sequential shift system. This system includes a sequencer 71 and a distribution logic 74. The sequencer 71 receives signals He and VALe and delivers a sequencing signal COM to the distribution logic 74. Logic 74 feeds the four sequential correlators 80a, 80b, 80c and 80d, only one of which 80a is shown, during the first ten sequences with the bits coming from the register 73 then, during the next thirteen sequences, with the bits coming from the four registers 72. The signal COM from the sequencing member 71 determines the shift sequence of registers 72 and 73.

The sub-module 85 further includes four dedicated 13-bit registers 76 for storing the continuity indices and the protection suffixes, and a common 10-bit register 75 storing the channel number.

Each of the sequential correlators 80 includes, like the correlators of FIG. 5, an XOR gate 54, a feedback AND gate 58 and a counter 55 delivering an overflow signal as soon as its contents exceed 3.

What is claimed is:

1. A packet demultiplexing device for demultiplexing an incoming signal comprising successive bursts of digital data distributed into packets, each packet consisting of:

useful data, and a header having a channel number indicating one of a plurality of service components to which said packet is assigned, additional information and a header error protection code, comprising:

circuit means for generating all error-free configurations consisting of a selected one of said channel numbers corresponding to a respective one of said service components and any possible form of said additional information;

encoding means for encoding all of said error-free configurations into all possible theoretical header configurations having said error protection code;

means for computing the Hamming distances between each packet header in said incoming signal and all said possible theoretical header configurations; and means for directing those packets for which the Hamming distance is not greater than a predetermined value to an output interface; whereby those packets which are assigned to a predetermined service component are extracted and delivered on a respective output by said output interface.

2. A packet demultiplexing device for demultiplexing an incoming signal comprising successive bursts of digital data distributed into packets, each packet consisting of:

useful data, and a header having a channel number indicating one of a plurality of service components to which said packet is assigned, additional information and a header error protection code, comprising:

an output interface having a plurality of data outputs, and a plurality of packet extraction units, each having:

(a) circuit means for generating all error-free configurations of a selected one of said channel numbers corresponding to a respective one of said service components and any possible form of said additional information;

(b) encoding means for encoding all of said error-free configurations into all possible theoretical header configurations having said error protection code;

(c) means for computing the Hamming distances between each packet header in said incoming signal and all said possible theoretical header configurations; and (d) means for directing those packets for which the Hamming distance is not greater than a predetermined value to said output interface;

said circuit means in separate ones of said extraction units being arranged for generating the configurations of different ones of said channel numbers and said output interface being arranged for directing the packets to different dedicated outputs depending upon which one of said extraction circuits directed the packet to the output interface;

whereby those packets which are assigned to a predetermined service component are extracted and delivered on a respective output.

3. Device according to claim 2, wherein the dedicated outputs are virtual outputs consisting of a single data output and means for assigning a particular predetermined enabling signal to each packet depending upon the extraction circuit which directed the packet to the output interface.

4. The packet demultiplexing device for demultiplexing an incoming MAC/PACKET signal comprising successive bursts of digital data distributed into packets, each packet consisting of:
useful data, and
a header having a channel number indicating one of a plurality of service components to which said packet is assigned, a continuity index and a header error protection code, comprising:
(a) circuit means for generating all error-free configurations consisting of a selected one of said channel numbers corresponding to a respective one of said service components and any possible value of said continuity index;
(b) encoding means for encoding all of said error-free configurations into all possible theoretical header configurations having said error protection code;
(c) means for computing the Hamming distances between each packet header in said incoming signal and all said possible theoretical header configuration; and
(d) means for directing those packets for which the Hamming distance is not greater than a predetermined value to an output interface;

whereby those packets which are assigned to a predetermined service component are extracted and delivered on a respective output.

5. Device according to claim 4, wherein said means for computing the Hamming distances comprise as many circuit sets as there are configurations corresponding to one channel number, each circuit set having a one-bit sequential correlator and a counter connected to the respective correlator for its counted to be increased by one upon each correlation failure detection.

6. Device according to claim 5, wherein each said dedicated counter has an overflow output which is activated when said Hamming distance is higher than the predetermined value and means for storing said overflow signal.

7. Device according to claim 5, wherein each of said one-bit sequential correlators comprises:
a shift register;
means for loading a particular one among all said coded header configurations corresponding to the selected channel number into the shift register;
means for shifting forward the content of a register by one position upon each arrival of a bit of the incoming signal;
a XOR gate connected to simultaneously receive an output bit of said register and the corresponding bit of header configuration, and
means for applying the output of the XOR gate on the upcounting input of the counter associated with the sequential one-bit correlator.

* * * * *

UNITED STATES PATENT AND TRADEMARK OFFICE
CERTIFICATE OF CORRECTION

PATENT NO. : 4,748,619
DATED : May 31, 1988
INVENTOR(S) : Vigarie, et al

It is certified that error appears in the above-identified patent and that said Letters Patent is hereby corrected as shown below:

On the title page assignee should read

--(73) Assignee: Etat Francais Represente Par Le Secretariat D'Etat Aux Poste S Et Telecommunications (Centre National D'Etudes Des Telecommunications), Etablissement Public De Diffusion Dit Telediffusion De France--.

Signed and Sealed this

Third Day of January, 1989

Attest:

DONALD J. QUIGG

Attesting Officer

Commissioner of Patents and Trademarks